United States Patent [19]
Yoshida et al.

[11] Patent Number: 5,437,471
[45] Date of Patent: Aug. 1, 1995

[54] INFLATOR WITH STARTER FOR SIDE COLLISION AIR BAG DEVICE

[75] Inventors: Ryouichi Yoshida; Hiroaki Fujii; Atsushi Tsuji; Tomoko Shimizu; Nobuya Osada; Takahiro Yamanishi, all of Shiga, Japan

[73] Assignee: Takata Corporation, Tokyo, Japan

[21] Appl. No.: 138,258

[22] Filed: Oct. 20, 1993

[30] Foreign Application Priority Data

Nov. 4, 1992 [JP] Japan .................................. 4-294955

[51] Int. Cl.⁶ ............................................ B60R 21/26
[52] U.S. Cl. .............................. 280/730.2; 280/734; 280/735; 180/274
[58] Field of Search ........... 280/728 R, 728 A, 730 R, 280/730 A, 743 R, 734, 735; 180/274

[56] References Cited

U.S. PATENT DOCUMENTS

| | | | |
|---|---|---|---|
| 3,663,035 | 5/1972 | Norton | 280/734 |
| 4,161,228 | 7/1979 | Svensson et al. | 280/734 |
| 5,112,079 | 5/1992 | Haland et al. | 280/730 A |
| 5,307,896 | 5/1994 | Taguchi | 280/735 |

FOREIGN PATENT DOCUMENTS

| | | | |
|---|---|---|---|
| 2225660 | 6/1990 | United Kingdom | 280/735 |
| 2255535 | 11/1992 | United Kingdom | 280/730 A |

*Primary Examiner*—Karin Tyson
*Attorney, Agent, or Firm*—Kanesaka & Takeuchi

[57] ABSTRACT

An inflator with a starter for starting a gas generator of a side collision air bag device is formed of: a needle disposed in the side face of a vehicle and made movable from the outside to the inside of the vehicle; an elastic member for urging the needle in the opposite direction to the movement of the needle; and a priming powder disposed forward of the movement of the needle. When the priming powder is hit by the needle, the ignition agent of the gas generator ignites to inflate an air bag.

6 Claims, 4 Drawing Sheets a device according to an embodiment of the present invention;

INFLATOR WITH STARTER FOR SIDE COLLISION AIR BAG DEVICE

BACKGROUND OF THE INVENTION

1. Field of the Invention

The present invention relates to a side collision air bag device for protecting an occupant against a side collision of a vehicle by extending an air bag between the occupant and a door and, more particularly, to an improvement in the inflator.

2. Description of the Related Art

In order to prevent a vehicle occupant from being brought against the side portion such as a door of a vehicle body at the time of a side collision, some cars are equipped with an air bag device. This side collision air bag device has its air bag extended when the vehicle has a side collision. In order to detect this side collision, there is provided a sensor for detecting a transverse acceleration of the vehicle, so that a diagnosis circuit decides the side collision, when the acceleration exceeds a predetermined value, to supply a starting current to the gas generator of the air bag device.

Thus, the starter for the side collision air bag device of the prior art has to be equipped with the acceleration sensor and the diagnosis circuit, so that its structure is complicated to raise the production cost.

OBJECT AND SUMMARY OF THE INVENTION

An object of the present invention is to solve the above-specified problem of the prior art and to provide an inflator with a starter for a side collision air bag device, which has a simple construction and a low production cost.

The starter for the side collision air bag device according to the present invention is constructed to actuate a needle directly or to close electric contacts by a deformation of an outer plate such as a door due to a side collision.

According to a first aspect of the present invention, there is provided a starter for starting a gas generator of a side collision air bag device, comprising: a needle disposed in the side face of a vehicle and made movable from the outside to the inside of the vehicle; an elastic member for urging the needle in the opposite direction to the movement of the needle; and a priming powder disposed forward of the movement of the needle and adapted to be hit by the needle to ignite the ignition agent of the gas generator.

According to a second aspect of the present invention, there is provided a starter for starting a gas generator of a side collision air bag device, comprising: a contact member disposed in the side portion of a vehicle defined by an inner plate and an outer plate and spaced and electrically insulated from the outer plate; a first electric route for conducting the outer plate and one pole of a power supply; a second electric route for conducting the contact member and the other pole of the power supply; and an electric igniter disposed in the second electric route for igniting the gas generator.

In the starter for the side collision air bag device according to the first aspect, the needle is pushed by the outer plate such as the door, when this outer plate is depressed into the cabin at the time of a side collision, to hit and ignite the priming powder of the gas generator.

In the starter for the side collision air bag device according to the second aspect, the outer plate or door is depressed, at the time of a side collision, into contact with the contact member so that, the electric igniter of the air bag device is energized to start the gas generator.

DESCRIPTION OF THE PREFERRED EMBODIMENTS

Figure 3:
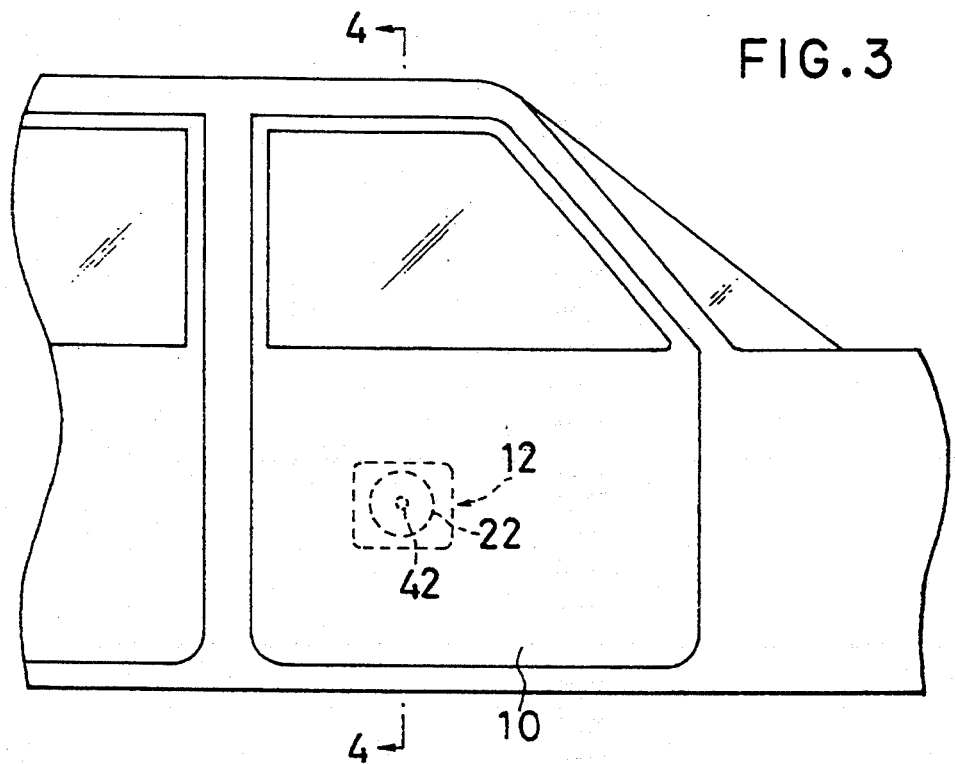
FIG. 3 is a side elevation showing a vehicle equipped with the device of the embodiment.
Figure 4:
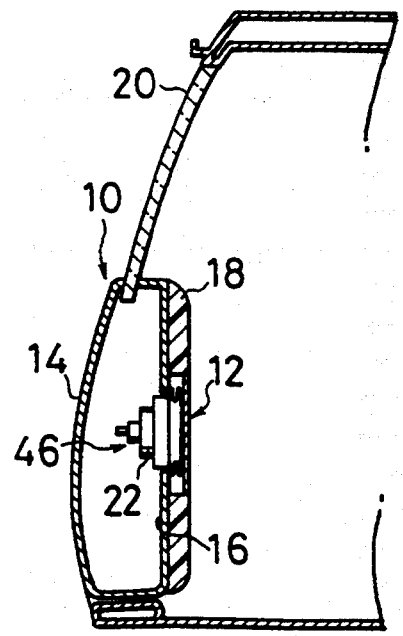
FIG. 4 is a sectional view taken along the line 4—4 of FIG. 3.

An embodiment of the present invention will be described in the following with reference to the accompanying drawings. As shown in FIGS. 3 and 4, an air bag device 12 is mounted in a door 10. This door 10 is composed of an outer plate 14, an inner plate 16, a trimming (or an ornamental member) 18 covering the inner plate 16 at the inside of a vehicle cabin, and a window glass 20.

Figure 1:
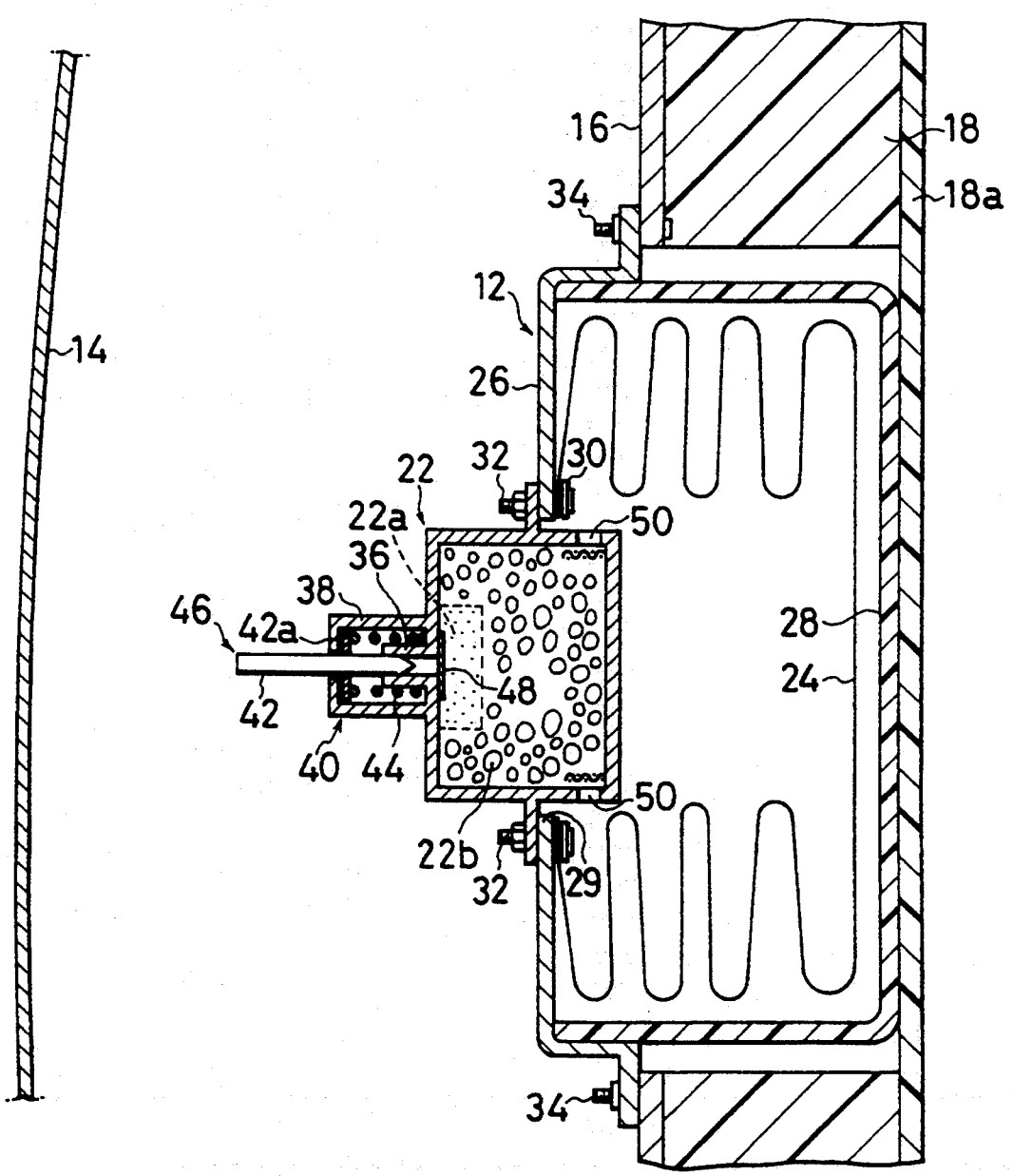
FIG. 1 is a sectional view showing a device according to an embodiment of the present invention.

The air bag device 12 is composed, as also shown in FIG. 1, of a gas generator (or inflator) 22, an air bag 24, a retainer 26 and a cover 28. The air bag 24 is fixed around the peripheral portion of an inflator mounting hole 29 of the retainer 26 by means a holding ring 30 and bolts 32. The retainer 26 is fixed on the inner plate 16 by means of bolts 34.

The inflator 22 is equipped with a starter 46 which includes: a needle guide 40 composed of an inner cylinder 36 and an outer cylinder 38; a needle 42 fitted slidably in the inner cylinder 36; and a spring 44 for urging a flange 42a of the needle 42 to the outside of the door.

The inflater 22 is charged with a priming powder 22a and a gas generating agent 22b, and its opening facing the inner cylinder 36 is sealed with a tape 48.

Figure 2:
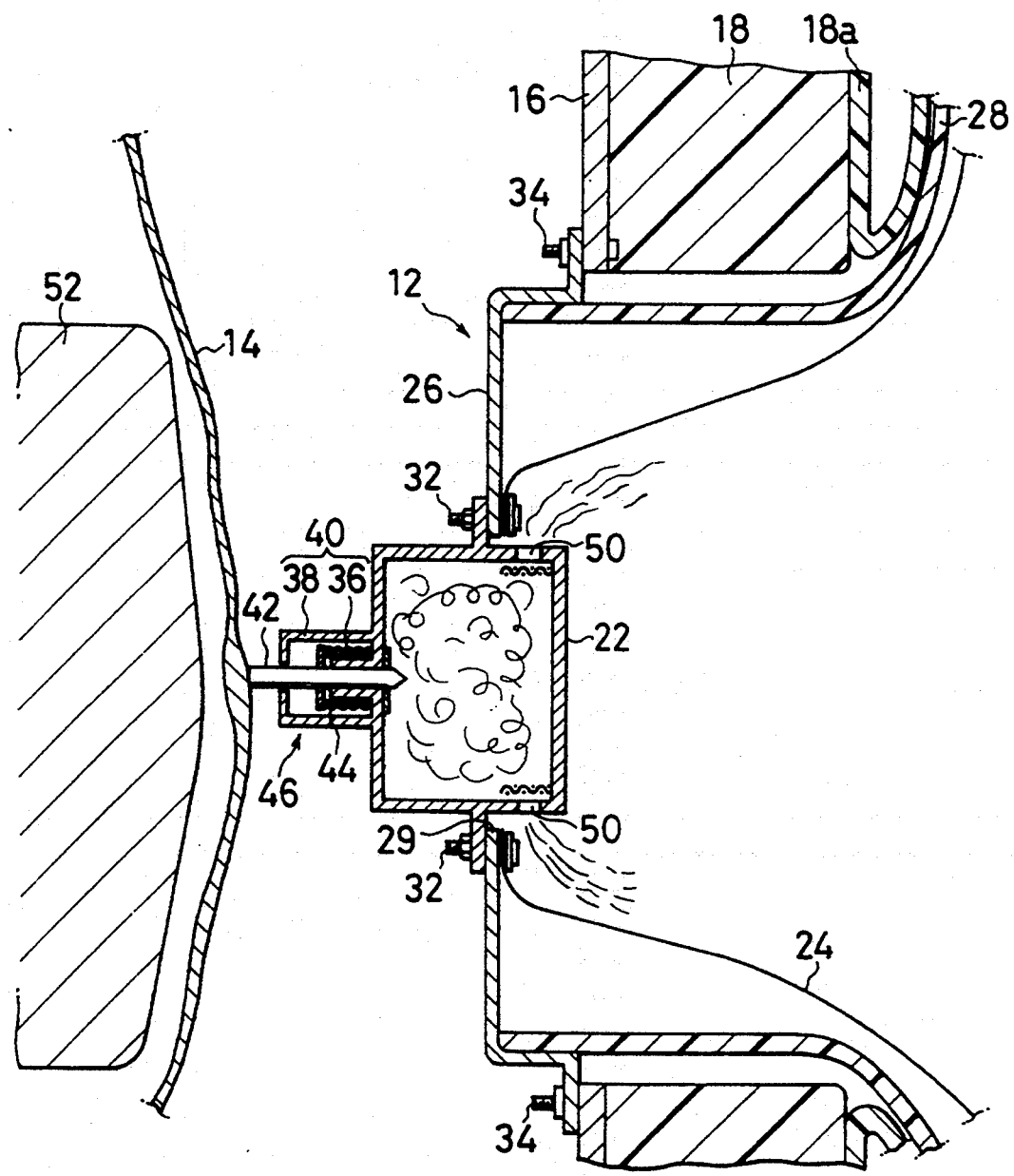
FIG. 2 is a sectional view showing the device of the embodiment in an operating state.

If a vehicle 52 hits the door, the needle 42 is protruded, as shown in FIG. 2, to break the tape 48 so that it hits and ignites the priming powder 22a. As this ignition occurs, the gas generating agent 22b is ignited to generate a great amount of gas instantly. This gas is injected from gas injection ports 50 to extend the air bag 24.

By this air bag 24 being extended, the cover 28 and a trimming skin 18a are torn to allow the air bag 24 to be extended into the cabin, as shown in FIG. 2.

Figure 5:
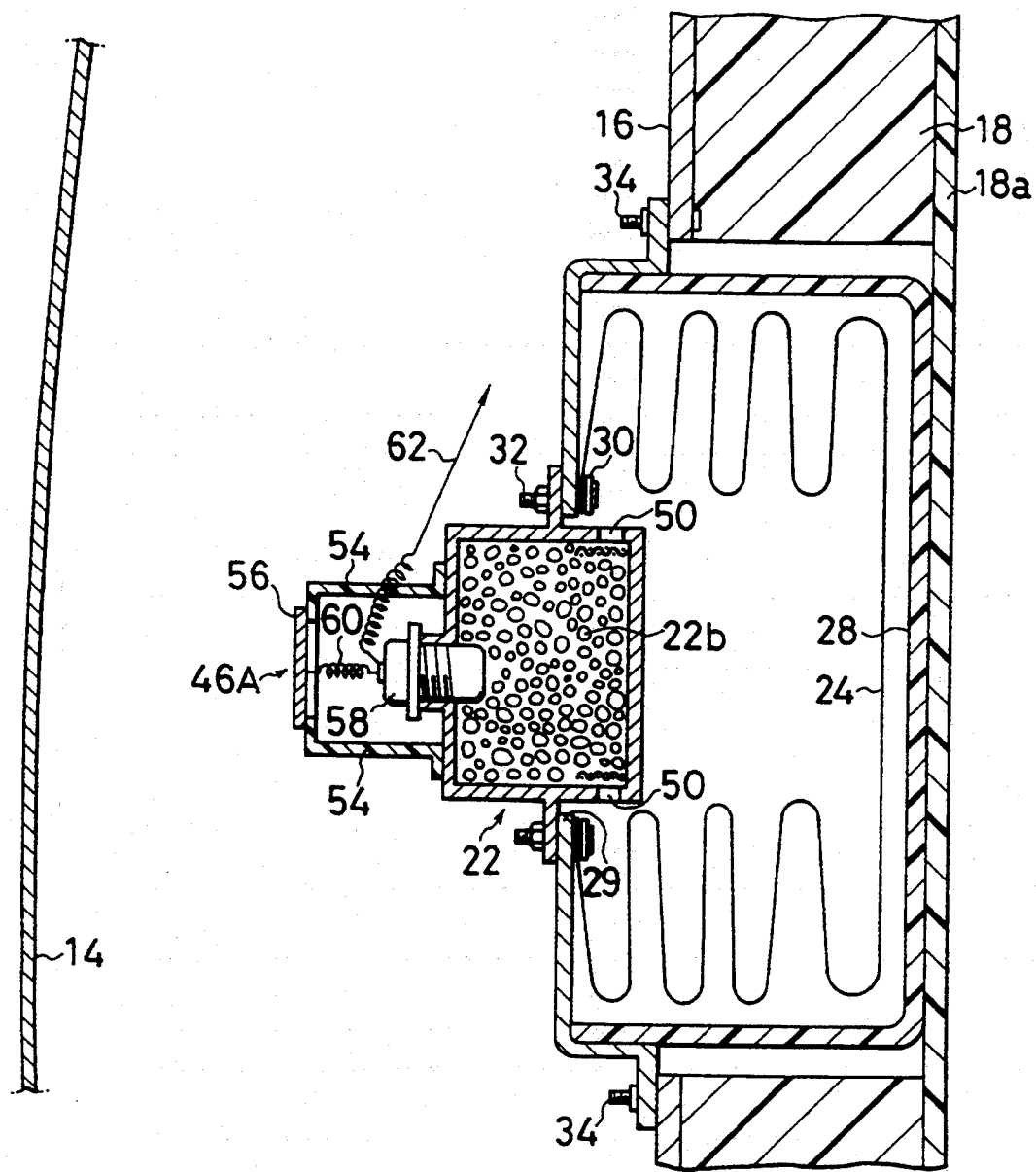
FIG. 5 is a sectional view showing a device according to another embodiment.
Figure 6:
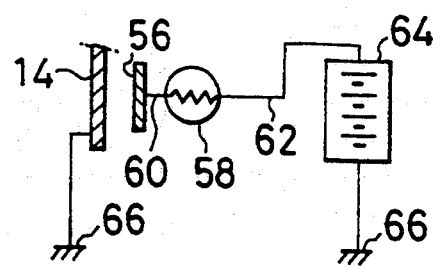
FIG. 6 is a circuit diagram showing the device of the embodiment of FIG. 5.

FIGS. 5 and 6 show an embodiment of an electric ignition type starter 46A. From the back face of the inflator 22, there is erected a stay 54 which is made of an insulating material such as a synthetic resin. The door outer plate 14 is faced by a copper plate 56 which acts as a contact member. The inflator 22 is equipped with an ignition plug 58 which has its cathode connected with the copper plate 56 through a first lead wire 60. On the other hand, the anode of the plug 58 is connected with the anode of a battery 64 through a second lead wire 62. The door outer plate 14 has a connection with the battery 64 through a vehicle body 66.

If the door outer plate 14 has a side collision against a vehicle, it is depressed into contact with the copper plate 56. Then, the electric current flows from the battery 64 to the plug 58 to ignite the gas generating agent 22b of the inflater 22. As a result, the air bag 24 is extended into the cabin like the foregoing embodiment. The remaining reference numerals in FIG. 5 designate the same portions as those of FIG. 1.

Incidentally, the aforementioned structure of the air bag device exemplifies the present invention, and the present invention can naturally be applied to a side collision air bag device other than the aforementioned one.

In the embodiment described above, the air bag device and the starter are mounted in the door but may be packaged in the side portion of a rear seat of a two-door vehicle.

As is now apparent from the embodiments thus far described, the starter for a side collision air bag device of the present invention has its structure simplified to have a reduced production cost, because the gas generating agent is ignited either by protruding the needle or by closing the electric contacts through the deformation of an outer plate such as the door.

What is claimed is:

1. An inflator for a side collision air bag device, comprising,
    a starter installed on a side portion of a vehicle, said starter including an outer cylinder; an inner cylinder coaxially disposed inside the outer cylinder; a needle slidably situated in the outer and inner cylinders and having an outer end located outside the outer cylinder an inner end situated inside the inner cylinder, and a flange situated inside the outer cylinder and fixed to the needle; and a spring situated inside the outer cylinder and engaging the flange to urge the needle outwardly of the vehicle so that the flange contacts an inner wall of the outer cylinder, and
    an inflator casing attached to the starter, said inflator casing including an opening to allow the inner end of the needle to enter into the inflator casing; a priming powder situated adjacent the opening to be ignited by the needle; and a thin member for covering the opening to prevent the priming powder to contact the needle so that when the outer end of the needle is pushed inwardly of the vehicle, the inner end of the needle penetrates the thin member and contacts the priming powder to thereby ignite the inflator.

2. A inflator according to claim 1, wherein said needle is disposed to have its rear end facing an outer plate of the vehicle.

3. An inflator according to claim 1, wherein said needle is arranged generally normal to the outer plate of the vehicle.

4. An inflator according to claim 1, wherein said needle has its leading end pointed.

5. An inflator according to claim 1, wherein said inflator casing further includes a gas generating agent outside the priming powder, said gas generating agent being ignited by the priming powder.

6. An inflator for a side collision air bag device to be installed in a vehicle having a side portion with inner and outer plates, comprising,
    an inflator casing attached to the inner plate of the vehicle, and containing a gas generating agent therein, and
    a starter attached to the inflator casing, said starter including an electric igniter contacting the gas generating agent in the inflator casing; a stay for covering the electric igniter and fixed to the inflator casing; a metal contact member disposed on the stay and facing the outer plate, said metal contact member being spaced apart from the outer plate so that when the outer plate bends, the outer plate contacts the metal contact member; a first electric route for connecting the outer plate to one pole of a power supply; and a second electric route for connecting the contact member and the other pole of the power supply through the electric igniter so that when the outer plate contacts the contact member, the gas generating agent is ignited by the electric igniter.

* * * * *